(No Model.)
W. H. SEIDERS & G. H. HOOD.
TOOL CHUCK.
No. 434,026. Patented Aug. 12, 1890.
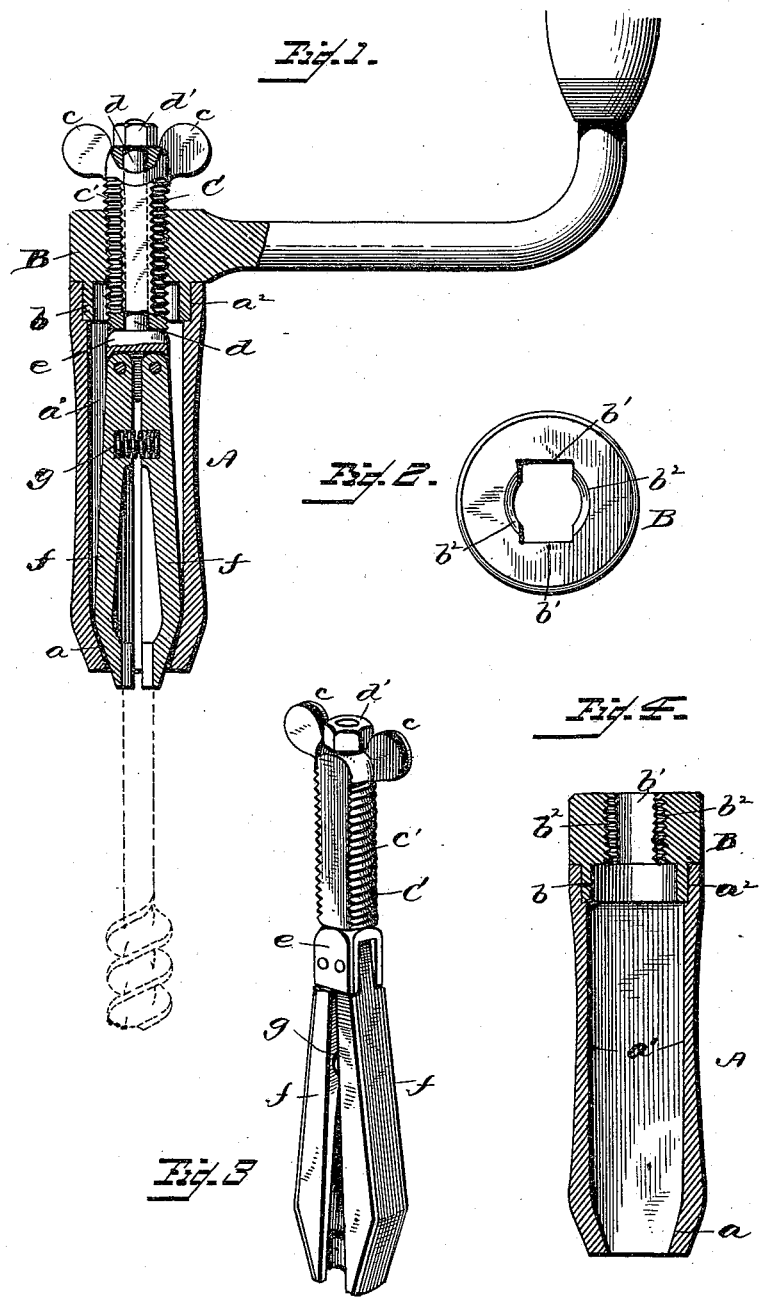

UNITED STATES PATENT OFFICE.

WILLIAM HANBY SEIDERS AND GEORGE HENRY HOOD, OF SPRING GREEN, WISCONSIN.

TOOL-CHUCK.

SPECIFICATION forming part of Letters Patent No. 434,026, dated August 12, 1890.

Application filed April 5, 1890. Serial No. 346,651. (No model.)

*To all whom it may concern:*

Be it known that we, WILLIAM HANBY SEIDERS and GEORGE HENRY HOOD, citizens of the United States, residing at Spring Green, in the county of Sauk and State of Wisconsin, have invented certain new and useful Improvements in Tool-Chucks; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to brace or tool chucks, and has for its objects to secure a chuck that is applicable for use on a drilling-press, a boring-brace, or other form of boring or drilling tool or machine, and which may have its grip tightened or loosened by a slight turn of the jaws holding the boring or drilling tool.

For the more particular description of the construction and operation of our improved chuck reference is asked to the following specific explanation of the accompanying drawings, in which latter—

Figure 1 is a central vertical section of the chuck as adapted to a carpenter's brace-stock. Fig. 2 is a plan view of the top of the chuck with the stock removed, and Fig. 3 is a detail of the gripping-jaws with their shank and thumb-screw. Fig. 4 is a vertical section of the chuck-shell.

A represents the chuck-shell, in which the inner face of the lower portion converges or inclines inwardly, as at $a$, the middle portion having square faces $a'$, and the upper portion $a^2$ being rounded.

B is the chuck-head with an annular flange $b$, about which fits the portion $a^2$ of the chuck-shell. This head is provided with a slot, two sides $b'$ of which are square, and the other two sides $b^2$ are rounded and threaded, and the squared portion of the slot is of greater diameter than the threaded portion. Within the slot is the sleeve C, the top of which has extensions or arms $c$ for the purpose of turning the sleeve and bringing its threads $c'$ in contact with the female threads in the chuck-head.

Into the longitudinal slot in the sleeve C is the shank $d$ of the gripping portion of our chuck, which consists of the shoulder $e$, in which are hinged the tapering and grooved jaws $f$. A spiral spring $g$ is placed between the jaws for the purpose of keeping them apart when not in use. The upper end of the shank $d$ projects above the sleeve C and is threaded for the reception of a nut $d'$, which prevents the sleeve from slipping off, and with the shoulder $e$ forms the bearings within which the sleeve is turned.

In the use of our improved chuck we turn the sleeve C, by means of the arms $c$, until the threads are disengaged from the head B. Then by pressing the tang of the drill to be used against the jaws $f$, the latter are forced up into the shell, where they open and receive the tang. The sleeve C is then pushed down, carrying with it the shank and the jaws until the latter are forced together by the converging sides of the shell. Then by a slight turn of the sleeve the grip is tightened and the parts firmly locked in position until a turn of the sleeve in the opposite direction releases them.

While we have shown our chuck applied to a hand-brace stock, it may be readily adapted to other forms of drilling-tools; and we therefore do not limit ourselves to the application illustrated, but

What we claim, and desire to secure by Letters Patent, is—

1. A tool-chuck having a head provided with a slot, two sides of which are square and having its other sides rounded and threaded, in combination with gripping-jaws secured to a threaded sleeve, by means of which and the chuck-head said jaws may be arrested in their vertical movement and firmly locked, substantially as described.

2. In a tool-chuck, the combination, with the chuck-head, of a threaded sleeve adapted to be locked by friction within the head, the spring-actuated gripping-jaws, their shank $d$, and the shell surrounding said jaws, substantially as and for the purposes described.

3. In a tool-chuck, the combination, with the chuck-head, of a threaded sleeve having arms or extensions, by means of which it may be turned, the spring-actuated jaws, and their shank, and the surrounding shell, as set forth.

4. A device for holding, boring, or drilling tools, consisting of a perforated and threaded head, a pair of gripping-jaws, a threaded sleeve, by means of which, with the head, the jaws are arrested in their vertical movement and firmly locked, and the shell surrounding the jaws, substantially as described.

5. In a tool-holder, the combination of the shell A, surrounding the gripping-jaws and having its lower portion tapering, the head B, having a slot threaded on its smaller diameter, the sleeve C, having broken threads $c'$, the spring-actuated jaws $f$, and their shank, for the purposes described.

In testimony whereof we affix our signatures in presence of two witnesses.

WILLIAM HANBY SEIDERS.
GEORGE HENRY HOOD.

Witnesses:
M. VAN BUREN,
L. K. PARKS.